April 1, 1941.  L. R. WILLIAMSON  2,237,170
BRAKE
Filed March 31, 1939  6 Sheets-Sheet 1

INVENTOR.
LARKIN R. WILLIAMSON
BY Horace B. Fay
ATTORNEY.

April 1, 1941.　　L. R. WILLIAMSON　　2,237,170
BRAKE
Filed March 31, 1939　　6 Sheets-Sheet 2

INVENTOR.
LARKIN R. WILLIAMSON
BY Horace B. Fay
ATTORNEY.

April 1, 1941.  L. R. WILLIAMSON  2,237,170
BRAKE
Filed March 31, 1939   6 Sheets-Sheet 4

Fig. 7

INVENTOR.
LARKIN R. WILLIAMSON
Horace B. Fay
ATTORNEY.

April 1, 1941.                L. R. WILLIAMSON                2,237,170
                                   BRAKE
                          Filed March 31, 1939              6 Sheets-Sheet 6

INVENTOR.
LARKIN R. WILLIAMSON
BY Horace B. Fay
ATTORNEY.

Patented Apr. 1, 1941

2,237,170

UNITED STATES PATENT OFFICE 2,237,170

BRAKE

Larkin R. Williamson, Brooklyn, N. Y., assignor to E. W. Bliss Company, Brooklyn, N. Y., a corporation of Delaware Application March 31, 1939, Serial No. 265,238

19 Claims. (Cl. 153—21)

This invention relates to a metal bending brake, and more particularly to an improved brake of clean and simple construction which may be easily assembled at the point of use.

Metal bending brakes constructed of steel plates are well known in the art. The use of metal plates in constructing such machinery has, however, in the past entailed structural objections due to the bending strains to which the frame plates were subjected; a difficulty which could be eliminated where heavy castings were employed and weight was no consideration.

It has been the general object of my invention to devise an improved and simplified brake which is more efficient than the type heretofore used and which is economical to manufacture and simple to construct.

Generally, my brake comprises end plates, a bed plate and a ram. Suitable shafts and gears are carried by the fixed parts to provide a drive for reciprocating the ram. The ram is mounted to transmit thrust imposed on it to the supporting frame in the plane of the end plates, thus preventing their deformation through bending. A fluid clutch and brake is employed to connect and disconnect the source of power and this is characterized by a double or two stage application of pressure during engagement of the clutch. Thus the initial clutch engaging pressure is increased at the time the work is done by an additional pressure which acts to prevent slippage of the clutch plates.

An electric system is provided to control the application of fluid to the clutch and brake and this system includes safety switches and an emergency stop to prevent damage to the parts if the machine is over-loaded. The machine may be adjusted for intermittent or continuous operation.

I further provide safety mechanism to protect the end plates against over-loading, which mechanism acts, if the plates are unduly stressed, to release the clutch and stop the machine before permanent injury is done to the parts.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings—

Referring now particularly to Figs. 1 through 4, my brake comprises a pair of end plates 20 and 21, which are bolted as at 23 to a suitable support carried by the foundation on which the machine is mounted. The forward portion of each plate is provided at 24 with outwardly extending shoulders on which is hung a bed 25. Interposed between the bed and shoulders is a strip 26 made of hardened steel to absorb the shock and wear between the parts and to transmit the load from the bed to the shoulders. The bed is prevented from falling from the shoulders by bolts 28 which pass into the adjacent part of the end plates. To further reinforce the bed and end plates, bracing webs 30 are provided which are triangular in shape and secured along the sides to the bed and respective end plates in a position parallel to the foundation. At the upper part of the end plates an angle member 32 is secured which extends across the bed and is fastened at its ends to each plate to reinforce the same and provide a solid non-yielding frame construction.

At the forward face of the plates 20 and 21 are ways 34 which slidingly guide a ram 35 mounted for reciprocating movement from and toward the bed 25 to bend a piece of metal positioned therebetween. The ram and the bed are provided with means for securing dies thereto, such as indicated by the dot and dash lines in Fig. 4.

Figure 7:
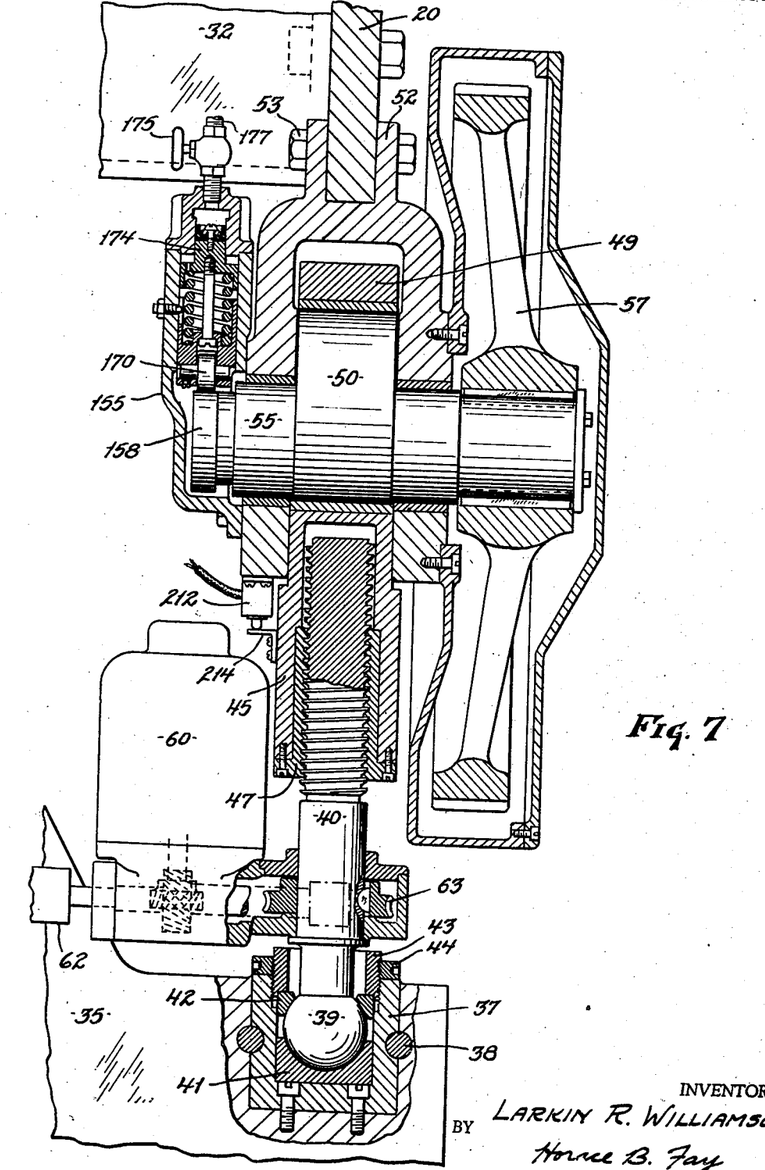
Fig. 7 is a section parallel to Fig. 1 showing the construction of the pitman and eccentrics operating the ram.

The ram is reciprocated by means of a pair of pitmans and eccentrics shown in Fig. 7. Adjacent each side of the top of the ram is a socket 37 keyed to the ram at 38 and receiving a ball 39 comprising the lower end of a pitman 40. The ball is received in a thrust bearing 41 and is held in place by a ring 42, which in turn is positioned by a collar 43 and a lock nut 44.

In addition to the lower part, the pitman also includes an upper sleeve 45 which threadingly receives and holds the lower part in a bushing 47. Each sleeve part is formed at its upper end as at 49 to receive an eccentric 50 by which each pitman acts to move the ram supported thereby up and down in the ways 34.

Figure 1:
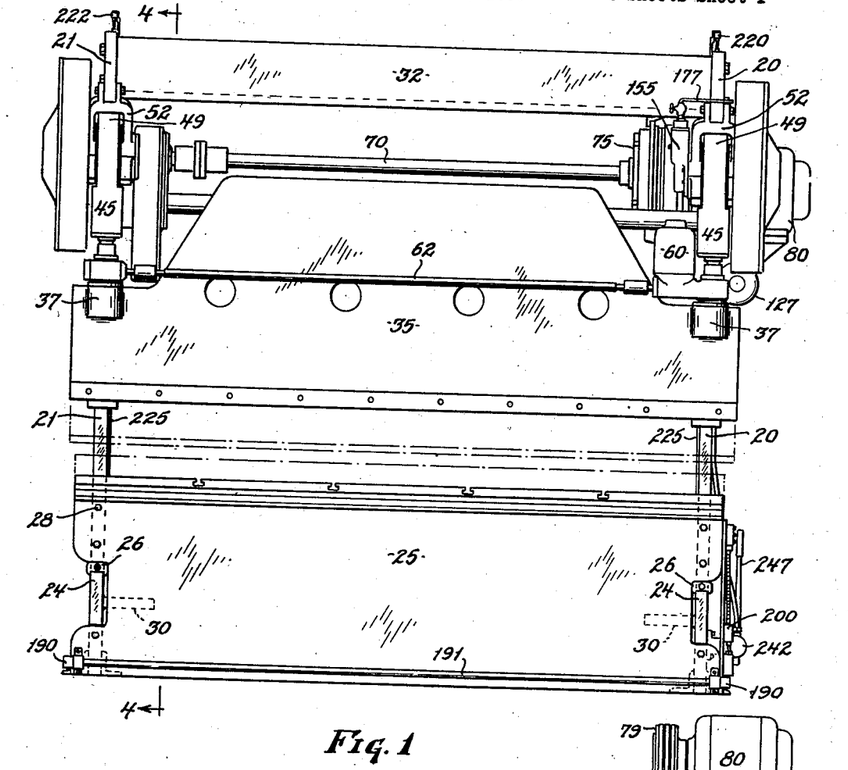
Fig. 1 is a front elevation of my brake.
Figure 2:
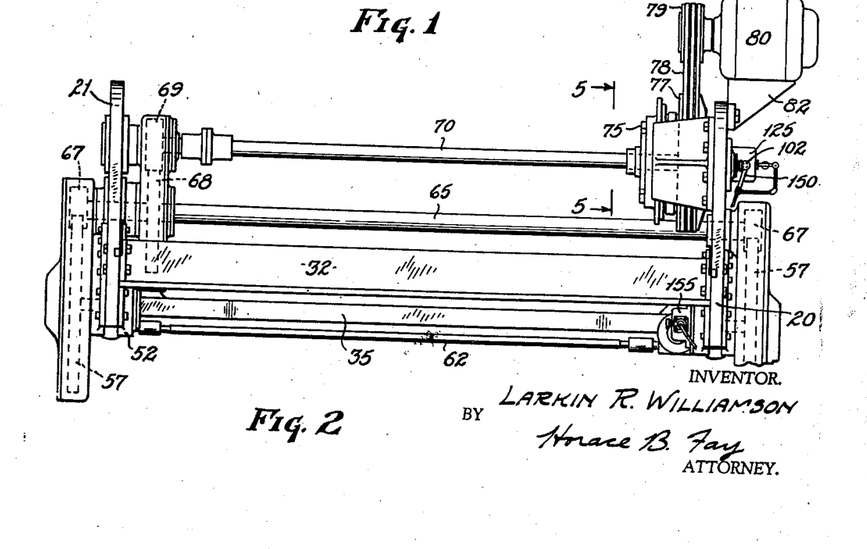
Fig. 2 is a plan view thereof.
Figures 3, 4, 12, 13:
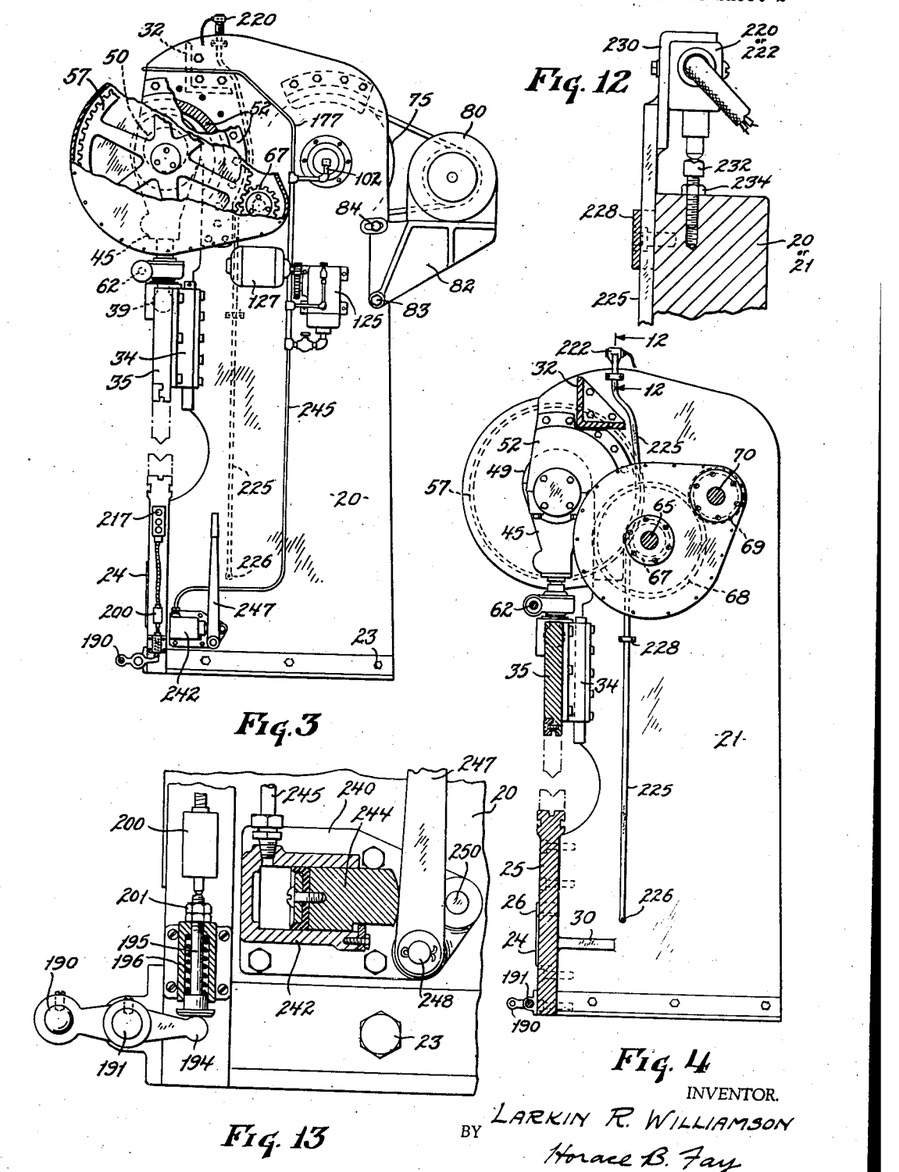
Fig. 3 is an end view.
Fig. 4 is a section through Fig. 1, as indicated by the line 4—4 thereon.
Fig. 12 is a detail of the safety mechanism, as shown by the line 12—12 on Fig. 4.
Fig. 13 is a detail of the fluid system controls.

Bifurcated supports 52 are bolted at 53 to each of the end plates 20 and 21 which are correspondingly recessed to receive them. Each support fits into the recessed part of the end plates, as shown in Fig. 3, to provide ample clearance for the respective pitmans and eccentrics. The construction just described allows all of the force applied against the ram to be applied in a line coinciding with the plane of each end plate and thus the tendency of the frame to bend in operation is largely eliminated. Each bifurcated support receives and rotatably supports a stub shaft 55, which in turn carries the eccentrics 50 heretofore described. On the exterior portion of each stub shaft is mounted a bull gear 57 by which the eccentric is rotated and the ram raised and lowered as hereafter described.

In setting up the machine for operation with a given pair of dies it is frequently necessary to adjust the position of the ram with respect to the bed. This is accomplished by turning the lower pitman parts 40 into or out of the sleeve 47. To this end I provide a motor 60 mounted on the ram structure which drives a telescoping shaft 62, extending across the ram and connecting at each end into the pitman construction at the ends of the ram. A pair of worms are carried at the ends of the shaft and each engages respectively with a worm wheel 63, keyed to each pitman element 40. Thus, depending on the direction in which the part 40 is rotated and the ram is raised or lowered with regard to the upper pitman structure 45 to adjust the ram with respect to the bed.

Figures 8, 9:
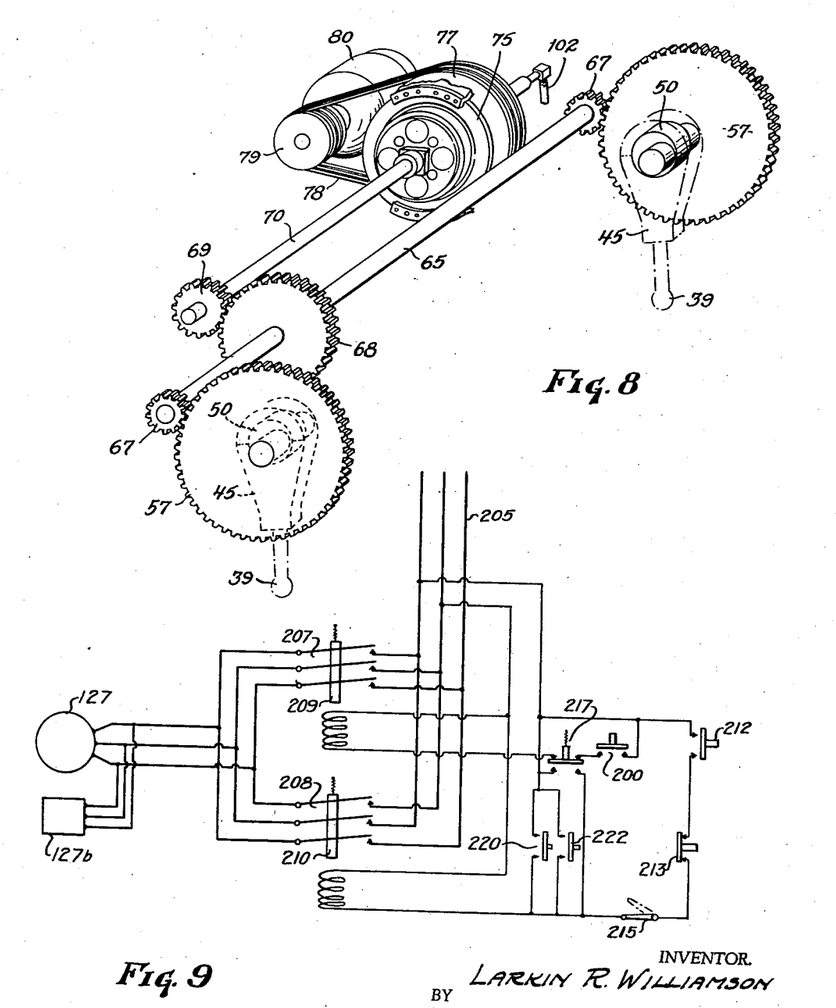
Fig. 8 is a perspective of the drive system of the brake.
Fig. 9 is a wiring diagram showing the electrical connections of the parts.

The eccentrics are rotated and the ram actuated by the driving mechanism shown in Fig. 8. In this figure the pitmans are shown as hung on the eccentrics 50, which in turn are rotatably carried with the bull gears 57. A back shaft 65 extends from one side of the tool to the other and is journaled in the end plates 20 and 21, as shown in Figs. 3 and 4. This shaft carries a pair of pinions 67 which engages with respective bull gears to drive the same. A large gear 68 on the shaft is driven by a pinion 69 carried on a clutch shaft 70 extending across the machine and mounted in the end members. Carried on the clutch shaft is a fluid operated clutch and brake, designated generally at 75 and further shown in Figs. 5 and 6 and hereafter described in connection therewith.

A flywheel 77 is incorporated with the clutch and brake unit and is provided with belt grooves to receive a series of belts 78 driven from the pulley 79 mounted on the shaft of a motor 80. The motor in turn is carried on a bracket 82 (Fig. 3) which is pivoted to the end plate 20 at 83 and provided with an adjustment at 84, by which tension in the belt may be varied.

Figures 5, 6:
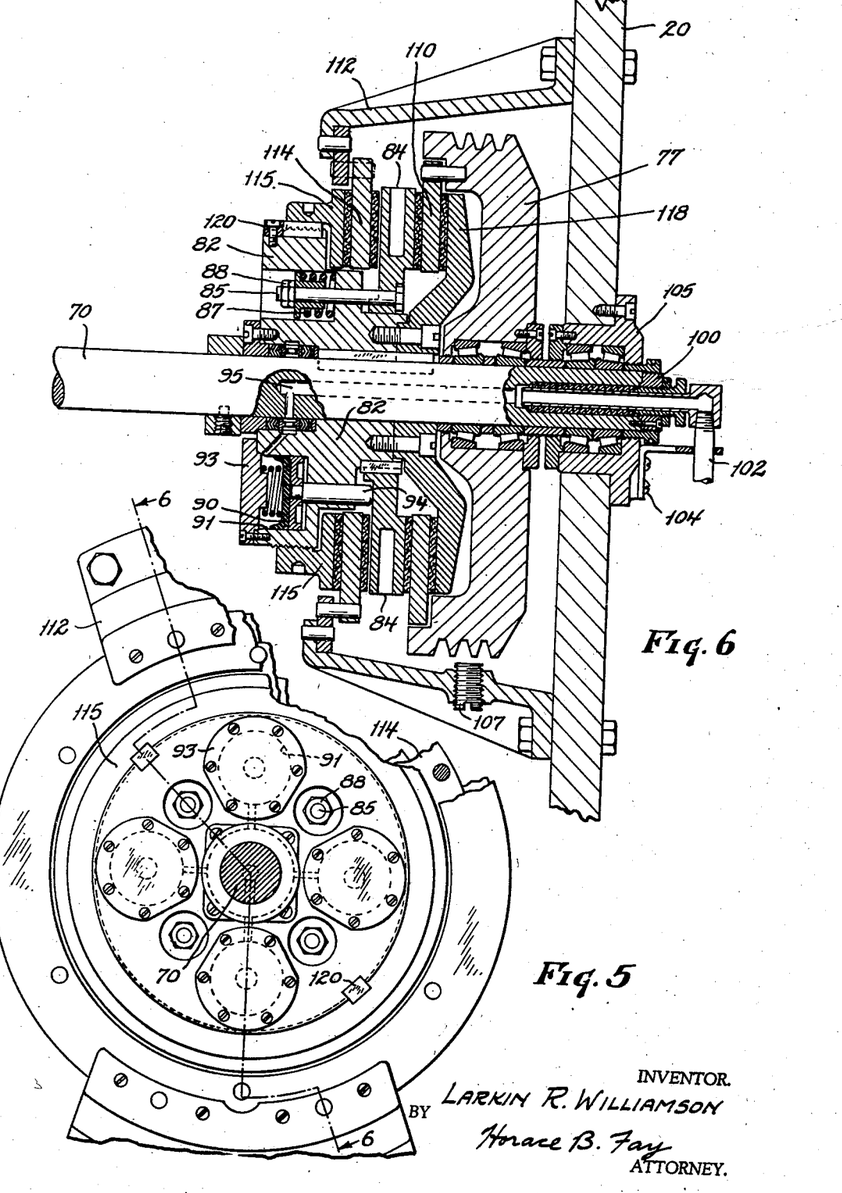
Fig. 5 is an end view of the clutch and brake mechanism, as indicated by the line 5—5 on Fig. 2.
Fig. 6 is a section through Fig. 5 as indicated by the line 6—6 thereon.

The construction of the clutch and brake is best shown in Figs. 5 and 6. As there shown the flywheel 77 is idly carried on the clutch shaft 70. Fixedly carried on the shaft is a hub 82 which supports a clutch ring 84 keyed thereto for sliding movement axially on the shaft. The ring is normally drawn to the left side of Fig. 6 and the clutch disengaged by a plurality of studs 85 carried by the ring which carry compression springs 87 interposed between the hub and nuts 88 at the ends of the studs.

To shift the ring to the right and engage the clutch, four pistons 90 are provided which are slidable in cylinders 91 in the hub. The cylinders are capped as at 93. Pins 94 extend through the hub and are engaged by the pistons to transmit the force applied against the pistons to the ring 84 to shift the ring to the right (Fig. 6) against the force of the springs 87. Fluid to actuate the pistons is brought under pressure to the cylinders by an axial passage 95 in the shaft 70 and related passages through the hub 82. The shaft 70 terminates in a seal 100 of the conventional type by which fluid is applied to the rotating shaft and cylinders from a stationary fixture 102 mounted at 104 on the end plate 20. A removable end bearing member 105 is bolted into the end plate 20 and supports ball bearings which in turn carry the shaft.

To change belts on the flywheel the unit 105 is bodily removed from the machine and the flywheel is supported against falling by supporting studs 107, which may be threadingly advanced upwardly against the flange of the wheel. It is then possible to remove the belts and replace them with new ones by passing the belts between the shaft and the end plate and without completely dismantling the machine, as has heretofore been customary.

The actual engagement of the clutch and shaft is effected by friction disks 110 carried by the flywheel and axially slidable thereon. The brake is engaged by a second set of friction disks slidably carried by the clutch housing 112 on a radial plate 114 and engaged by ring 84. When the clutch ring 84 is shifted to the left (Fig. 6) by the springs 87 it clamps the friction member 114 between itself and a ring 115 integral with the hub to lock the shaft 70 against rotation. On the other hand, as the ring 84 is moved to the right by admitting fluid to the cylinder 91 the clutch element 110, carried by the flywheel, is clamped between the ring 84 and a hub flange 118 to couple the flywheel and the shaft as a rotative unit and drive the brake. To compensate for wear in the friction surfaces the ring 115 may be adjusted axially of the hub and then keyed as at 120 to retain the parts in position.

Figures 10, 11:
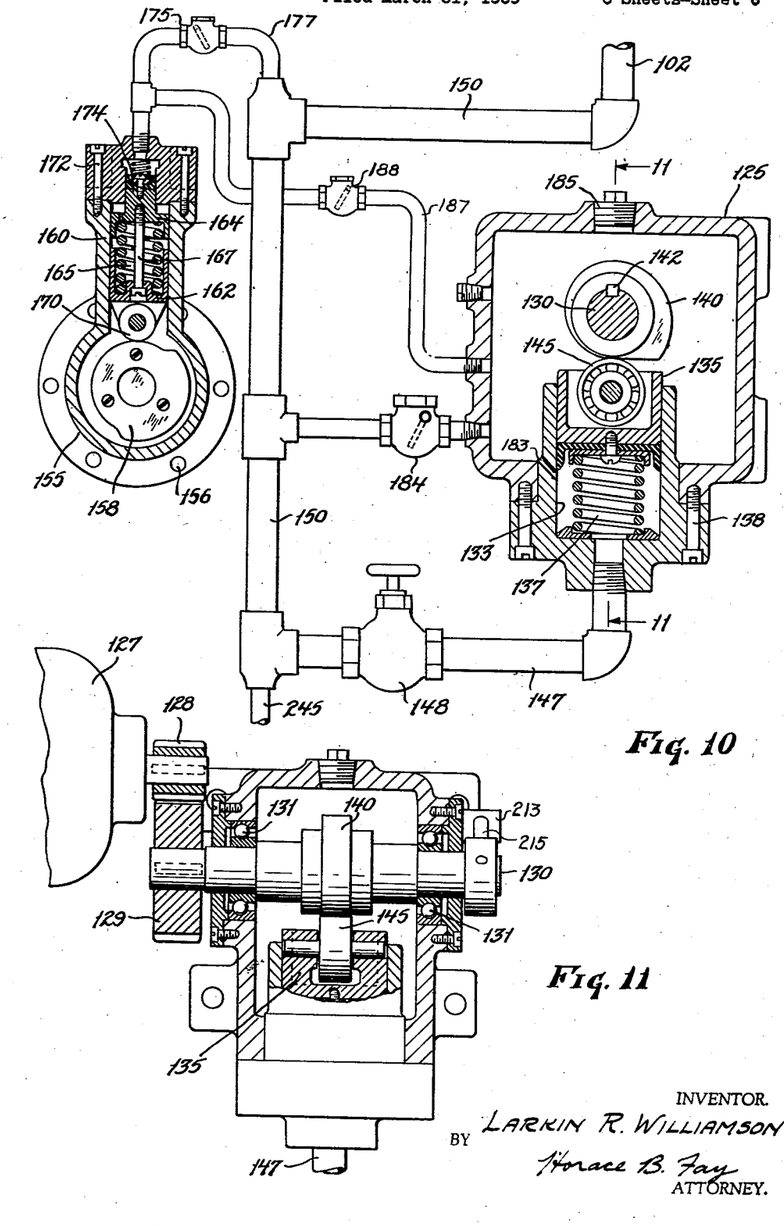
Fig. 10 shows the fluid system by which the clutch is engaged.
Fig. 11 is a section through Fig. 10, as indicated by the line 11—11 thereon.

Fluid, as oil, under pressure, to actuate the pistons 90, is supplied through the mechanism shown in Figs. 3, 10 and 11. This system includes two pumping units by which an initial pressure is first applied to engage the clutch and after such engagement an additional higher pressure is applied which remains in force during the operating stroke of the ram.

The first or low pressure pump is mounted on the end plate 20 (Fig. 3), as generally indicated at 125 and includes therewith an electric torque motor 127 and magnetic brake 127b, by which the pump is driven and controlled. A shaft from the motor carries a pinion 128 driving a gear 129 on the camshaft 130 journaled in the housing 125 in ball bearings 131.

The pump proper includes a cylinder 133 in the casing which receives a piston 135, normally held in an upward position by a compression spring 137. The entire piston and cylinder unit is removable through the under side of the pump casing by removing the bolts 138. A cam 140 is keyed at 142 to the shaft 130 and as the shaft is rotated by the torque motor the cam surface pushes the piston 135 downwardly by bearing against a ball bearing cam follower 145, rotatably mounted in a slot in the piston. The torque motor becomes stalled when it has turned the cam 140 far enough to apply a fluid pressure equal to the power of the motor. The period of rotation of the motor is so short that before the workman releases the foot pedal hereafter described the motor will have done its work. When the pedal is released the current to the motor is cut off and the brake is set to hold the pump in an active position.

Piping 147 leads from the cylinder 133 through a shut-off valve 148 and a pipe line 150 to the stationary intake 102 to the shaft 70 (Fig. 6). The pressure established as just described actuates the clutch pistons 90 and engage the clutch to rotate the shaft 70, which in turn drives the gear train of Fig. 8, including the shaft 65 and eccentrics 50.

A second pump to apply increased operating pressure to the system during the work stroke of the machine is actuated by the right hand eccentric 50. The second pressure pump, best shown in Figs. 7 and 10, comprises a casing 155, bolted at 156 to the bifurcated member 52. Part of the casing encircles the end of the shaft 55, on which is mounted a cam plate 158 rotatable therewith and shaped as shown in Fig. 10. A cylinder 160 is formed in the casing and receives a piston unit formed of two parts 162 and 164 normally held apart by a compression spring 165. The amount these parts can separate may be adjusted and is limited by a bolt 167. The lower piston part 162 carries a follower 170 which rides against the cam 158.

A small high pressure cylinder block is bolted to the top of the casing 155 by bolts 172 and receives an extension 174 of the piston unit 164 of reduced diameter. This cylinder communicates through a check valve 175 with piping 177 communicating with the piping 150 which leads to the clutch. This mechanism functions to apply an increased operating pressure to the clutch plates which augments the pressure already established by the pump 125.

The high pressure pump includes a self-contained safety mechanism to prevent applying an unsafe pressure to the fluid system. To this end the spring 165 is of a predetermined strength to be compressed when the highest desired operating pressure is attained in the fluid system. When this point is reached the portion 164 of the piston unit will remain stationary because the fluid pressure is greater than the spring strength of the spring 165. As a result, the portion 162 of the piston unit may reciprocate under the influence of the cam 158, although no increased operating pressure will be applied to the system because the part 174 will be stationary and the spring compressed.

The fluid system is replenished with oil on each stroke of the piston 135. As the piston rises it creates a suction in the adjacent piping because the pipe friction and viscosity of the oil retard the flow of oil from the clutch. Thus more oil will be drawn into the system through check valve 184 than it can normally handle. As the brake springs force the oil out of the clutch the excess oil in the system passes back to the housing through the passage 183 in the cylinder wall which is exposed on the up stroke of the piston 135. As soon as the piston starts down this opening is cut off. To supply oil to the casing 125 a removable plug 185 is provided.

Small quantities of oil must be added from time to time to the high pressure cylinder block. This is accomplished through piping 187 connecting the housing and the piping through a check valve 188. Normally the valve 188 is held closed. However, as the amount of oil in the cylinder drops below the required amount the suction created opens the valve and draws oil into the cylinder.

To energize the motor 127 and start the operation of the brake the electric system shown in the wiring diagram of Fig. 9 and the foot pedal mechanism of Fig. 13 is provided. A foot treadle 190 is pivotally carried at 191 by a bracket 192 bolted to the machine frame. An inner end 194 of the treadle actuates a push rod 195 normally held downwardly thereagainst by a compression spring 196 (Fig. 13). As the treadle forces the push rod upwardly, a switch 200 is closed, which completes a circuit to the stalling torque motor 127, beginning the operation of the pump mechanism. The length of the push rod 195 may be adjusted by the nuts 201. The switch 200, as shown in the wiring diagram of Fig. 9, establishes a circuit to rotate the motor in one of two directions to apply pressure to the system through piston 135. The system includes control mechanism and safety devices to prevent overloading or damaging of the parts.

Referring to the wiring diagram in Fig. 9, the motor 127 and the magnetic brake 127$^b$ are alternately connected to a source of power 205 by a forward switch 207 or a reversing switch 208. The switches in turn are actuated by electric controls 209 and 210, respectively. When the switch 200 is closed current passes from the line 205 to actuate the mechanism 209 and close the forward switch 207, thereby energizing the motor 127 to engage the clutch mechanism as heretofore described as long as the operator keeps his foot on the treadle. When he releases the treadle the switch 200 opens and the forward circuit is broken, cutting off the supply of current. This allows the brake 127$^b$ which is spring actuated, to lock and hold the cam 140 in the position then attained.

When the brake is intermittently operated the clutch remains engaged until the ram has descended and has almost completed its upward stroke, at which time the motor 127 is reversed by a limit switch 212 (Fig. 7), actuated by a lug 214 mounted on the pitman member 45. When this switch is energized (Fig. 9) the mechanism 210 is actuated to reverse the motor and back off the cam 140, releasing the pressure in the system. The mechanism is so arranged that the brake is stopped, while the cam follower 170 (Fig. 10) is on the portion 158 of least diameter. The inertia of the parts will carry the ram and pitman past the point closing switch 212 and thus allow the switch to open, positioning the electrical circuit for operation through a second cycle. A limit switch 213, operated by an adjustable arm 215 on shaft 130 is provided and is opened each time the torque motor returns the cam 140 to the position of Fig. 10. Thus, if the switch 212 is not opened this latter switch will act to open and release the reversing switch 208.

To provide a continuously operating tool a switch 215 is provided which if open prevents the energizing of the switch 208 which reverses the motor. When the switch is closed, as shown in Fig. 9, the mechanism is established for intermittent operation. A manual emergency switch 217, also mounted on the side of the machine in Fig. 3, is provided to quickly reverse the motor and release the clutch pressure to stop the operation of the tool. The switch is normally in the position shown in Fig. 9, and is shifted to engage the lower contacts and reverse the motor 127 to stop the brake in an emergency.

To prevent undue stressing of the end plates 20 and 21 safety mechanism, as shown in Figs. 3, 4 and 12, including a pair of safety switches 220 and 222, is provided. This mechanism comprises two units each consisting of a strap 225 pinned at 226 to the lower portion of a respective end plate. Each strap passes upwardly through guides 228 carried by the plate and is curved as indicated to avoid interference with the parts of the press and each strap terminates adjacent the top of a respective end plate. Welded at the top of each strap (Fig. 12) is a bracket 230 which carries a very sensitive limit switch 220 or 222, as the case may be, connected into the system as indicated on the wiring diagram of Fig. 9. Threadingly carried in the top of each plate and adapted to underlie the actuating member of each switch is a bolt 232 adjustably locked in position by a lock nut 234.

The safety mechanism functions to reverse the supply of current to the motor 127 and remove the load from the tool if either end plate is unduly strained. In other words, if an excessive load is applied at the dies there is a tendency for the plates 20 or 21 to stretch beyond their elastic or safe limits. The mechanism is so adjusted that before this limit is reached the elongation of either plate will have actuated the corresponding limit switch and closed the reversing circuit to the motor 127, thus backing off the cam 140 (Fig. 10) and disengaging the clutch and applying the brake as heretofore described.

To inch the tool in setting dies or the like it is desirable to provide manual means to apply small increments of pressure to the fluid system and closely control the position of the ram. I accomplish this by mechanism best shown in Figs. 3 and 13. As there shown I provide a bracket 240 bolted to the end plate 20 and carrying a cylinder 242, in which slides a piston 244. The cylinder communicates through piping 245 with the general fluid system, as shown in Fig. 10. A hand lever 247 is pivoted at 248 to the bracket 240. Its movement to the right (Fig. 13) is limited by a pin 250 and when the lever is moved to the left pressure is applied to the system by the piston 244 to lightly engage the clutch and turn over the parts. The clutch is disengaged by simply shifting the lever in the other direction. The amount of pressure applied is just enough to engage the parts and not enough to prevent stalling of the tool by slippage of the clutch plates if any appreciable load is applied to the ram. With this mechanism it is thus possible to safely inch the ram during adjustment of the ram and the dies for set-up purposes before beginning production operation of the machine. The hand lever may of course be applied to actuate the parts at any time where no appreciable hold is to be applied to the tool.

Operation

The operation of the brake is as follows:

The desired dies, as shown in dotted lines (Figs. 1 and 4) are mounted on the bed 25 and the ram 35 in approximately cooperating relation and the ram is slowly inched to bring the dies into the working position desired at the bottom of the stroke, at which time final adjustment for ram stroke is made. This inching movement is had by manual manipulation of hand lever 247, which actuates piston 244 and applies pressure to the fluid in pipes 245, 150 and 102 to engage the clutch 75.

The stroke of the ram is constant and is predetermined by the eccentric 50, but the effective ram position at a given instant can be raised or lowered by energizing motor 60, which elongates or shortens the effective length of the pitman. Thus the end of the stroke can be adjusted with respect to the bed 25.

A sheet to be worked is placed in position upon the lower die and the foot treadle 190 is depressed, releasing the magnetic brake 127b and energizing motor 127, which moves piston 135 and applies pressure to fluid in piping 147, 150 and 102 to engage clutch 75. When this pressure builds up to a predetermined amount, the motor 127 stalls, but it remains energized until treadle 190 is released, at which time brake 127b locks the motor against rotation, causing the pressure to remain constant at a built-up level.

When ram 35 has travelled downwardly so that it is about to contact the sheet, the cam 158 moves piston 164, thereby increasing the pressure in piping 177, 150 and 102, causing an increase in the engaging pressure of the friction surfaces of the clutch 75. Thus, when the die which is carried by the ram contacts the article, the clutch is less apt to slip and greater forces can be transmitted by the ram.

If these forces become so great or are so directed that one of the side plates 20 or 21 is unduly stressed and stretched, one or both of the safety switches 220 or 222 is activated to release brake 127b and reverse the direction of rotation of motor 127 releasing piston 135. Thus, the stresses in side plates 20 or 21 is relieved before damage is done, as by stretching beyond the elastic limit.

When the ram reaches its lowermost position, cam 158 has rotated so as to partially release the pressure engaging the clutch 75.

The clutch remains in engagement, however, until the ram is almost to the top of its stroke, at which time switch 212 will act to release brake 127b and reverse motor 127 to completely release clutch 75, at such time that the ram, due to inertia, will coast to its uppermost position and the ram cycle is completed.

When motor 127 is reversed, it will be stopped by limit switch 213, so that cam 140 is in its original position. The cycle of the entire machine is now complete and subsequent cycles are commenced by depressing treadle 190.

From the foregoing description it will be apparent that I have provided an improved press brake which is of simplified and more efficient construction.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a machine tool, a fixed frame comprising relatively thin plates, a movable work member adapted to cooperate with said fixed frame to perform a work operation and thereby stress said plates, power means to drive said work member, and means operative automatically whenever the stress in one of said plates is beyond a predetermined point to prevent said power means from driving said work member.

2. In a machine tool, a frame, a movable slide carried thereby, power means to drive said slide, a clutch interposed between said power means and said slide, frame members to receive the stress resultant from the work stroke of said slide, and means operative automatically consequent upon straining one of said frame members beyond a predetermined point to disengage said clutch.

3. In a machine tool, a frame, a movable slide carried thereby, power means to drive said slide, a clutch interposed between said power means and said slide, frame members to receive the stress resultant from the work stroke of said slide, means associated with one of said frame members responsive solely to the deformation of one of said frame members due to the stress transmitted thereto and means operative by said responsive means to disengage said clutch consequent upon a predetermined degree of deformation in one of said frame members.

4. In a machine tool of the class described, a frame including a bed, a ram movably carried by said frame, power means to drive said ram, a clutch interposed between said ram and said power means, a power operated means to connect said clutch and a manual means auxiliary to said power means to engage said clutch independently of said power means.

5. In a machine tool of the class described, a tool holder, a movable tool holder, power means to drive said movable tool holder, a clutch interposed between said power means and said tool holder, fluid pressure means to actuate said clutch, manual means to apply pressure to said pressure means to engage said clutch and power means to apply pressure to said pressing means independently of said manual means to engage said clutch.

6. In a machine tool of the class described, a frame including a bed, a ram movably carried by said frame, power means to drive said ram, a clutch interposed between said ram and said power means, means to engage said clutch to drive said ram and a second means operative additional to said first means to apply an increased operating pressure to said clutch engaging means.

7. In a machine tool of the class described, a frame, a ram movably carried by said frame, power means to drive said ram, a clutch interposed between said ram and said power means, means to apply an initial engaging force to said clutch to begin the movement of said ram and means operative after said ram has attained a predetermined position to apply an increased engaging force to said clutch during the work performing stroke of said ram.

8. In a press brake or the like, a stationary frame, a ram slidably carried by said frame, a pair of eccentrics in said frame adjacent the ends of said ram, pitmans interconnecting the ram and respective eccentrics, a bull gear carried by each eccentric, a back shaft extending across said frame, pinions thereon engaging respective bull gears, a clutch shaft, interengaging gears on the back shaft and clutch shaft, a pulley wheel on said clutch shaft, a clutch to engage said pulley to drive said clutch shaft and means to drive said pulley wheel.

9. In a press brake or the like, a pair of end plates, a bed plate extending between said end plates, a top brace connecting said end plates to provide a frame structure, a pair of bifurcated supports integral with said end plates, eccentrics carried in said supports, pitman members carried by said eccentrics between the bifurcations of said supports and a ram carried by said pitman members.

10. In a machine tool of the class described, a frame comprising a pair of end plates, a slide reciprocably carried by said end plates adjacent the forward edge thereof, said plates having recesses at the forward portions thereof above said slide, a bifurcated support mounted in each recessed portion, flanges on each support to engage the opposing faces of a respective plate adjacent said recess, means to rigidly secure said flanges to the respective plate, an eccentric mounted in each support, a pitman carried by each eccentric between the bifurcations of said respective supports and operatively connected to said slide.

11. In a machine tool of the class described, a pair of spaced end plates, a bed plate secured to the forward part of said end plates to provide a frame structure, a ram slidably carried by said end plates, a pair of eccentrics mounted adjacent respective end plates, power means to drive said machine including a fluid operated clutch, a pump unit carried by said frame adjacent an eccentric to apply fluid pressure to said clutch and a cam rotatable with said eccentric to drive said pump.

12. In a machine tool of the class described, a pair of spaced end plates, a bed plate secured to the forward part of said end plates to provide a frame structure, a ram slidably carried by said end plates, a pair of eccentrics mounted adjacent respective end plates, power means to drive said machine including a fluid operated clutch, a pump and operating means therefor to apply fluid pressure to said clutch to establish a drive to said machine, a second pump unit carried by said frame adjacent an eccentric thereof to apply further fluid pressure to said clutch and a cam rotatable with said eccentric to drive said second pump unit.

13. In a machine tool of the class described, a pair of end plates, a ram slidable with respect thereto, a bifurcated support carried by each end plate with the region between the bifurcations in alignment with the general plane of said plates respectively, an eccentric member rotatably mounted in the bifurcations of each support, a pitman member carried by each eccentric, a ball and socket connection in each end of said ram in alignment with said pitmans respectively and means to retain respective pitmans in said socket connection.

14. In a machine tool of the class described, a pair of end plates, a ram slidable with respect thereto, a bifurcated support carried by each end plate with the region between the bifurcations in alignment with the general plane of said plates respectively, an eccentric member rotatably mounted in the bifurcations of each support, a hollow pitman member carried by each eccentric, a ball and socket connection in said ram in alignment with each eccentric, rotatable pitman members supported at one end in said sockets and at the other end threadingly received in respective hollow members and rotatable to adjust the distance between respective eccentrics and sockets.

15. In a machine tool of the class described, a pair of end plates, a ram slidable with respect thereto, a bifurcated support carried by each end plate with the region between the bifurcations in alignment with the general plane of said plates, respectively, an eccentric member rotatably mounted in the bifurcations of each support, a pitman member carried by each eccentric, a ball and socket connection interposed between said pitman member and said ram in alignment with each eccentric and means to vary the distance between a point on said ram and the axes of said eccentrics.

16. In a machine tool of the class described, a pair of end plates, a ram slidable with respect thereto, a bifurcated support carried by each end plate with the region between the bifurcations in alignment with the general plane of said plates respectively, an eccentric member rotatably mounted in the bifurcations of each support, an extensible pitman member interconnecting each eccentric and said ram and power means to synchronously extend said pitman members.

17. In a machine tool of the class described, a pair of flat end plates with outstanding shoulders formed at the lower forward edges thereof, a bed plate with recesses extending inwardly from the end edges thereof to interlock with said shoulders respectively and corner brace members secured to the inner face of said bed and said end plates respectively to form a unit of said bed and said end plates.

18. In a machine tool of the class described, a pair of frame members, a shaft extending therebetween, a drive pulley on said shaft between said frame members, a removable shaft bearing in one frame member of such configuration that, when removed, an opening is provided between the shaft and said last-named frame member and means to suspend the shaft in said opening to permit replacement of a continuous belt on said pulley through said opening.

19. In a device of the character described, a frame having uprights, a ram adapted to cooperate therewith to perform a working operation and thereby strain said uprights, power means to drive said ram and means for preventing said power means from driving said ram, said means being automatically operative solely upon said strain reaching a predetermined limit.

LARKIN R. WILLIAMSON.